United States Patent
Ben Khalifa et al.

(10) Patent No.: US 10,127,673 B1
(45) Date of Patent: Nov. 13, 2018

(54) WORD BOUNDING BOX DETECTION

(71) Applicant: Workday, Inc., Pleasanton, CA (US)

(72) Inventors: Amine Ben Khalifa, Pleasanton, CA (US); Liang Huang, San Leandro, CA (US); Ryan Stenson, San Francisco, CA (US)

(73) Assignee: Workday, Inc., Pleasanton, CA (US)

( * ) Notice: Subject to any disclaimer, the term of this patent is extended or adjusted under 35 U.S.C. 154(b) by 16 days.

(21) Appl. No.: 15/382,299

(22) Filed: Dec. 16, 2016

(51) Int. Cl.
*G06K 9/00* (2006.01)
*G06T 7/11* (2017.01)
*G06K 9/46* (2006.01)

(52) U.S. Cl.
CPC .............. *G06T 7/11* (2017.01); *G06K 9/4604* (2013.01); *G06K 2209/01* (2013.01); *G06T 2207/20112* (2013.01)

(58) Field of Classification Search
CPC ............ G06T 7/11; G06T 2207/20112; G06K 9/4604; G06K 2209/01
See application file for complete search history.

(56) References Cited

U.S. PATENT DOCUMENTS

| | | | | |
|---|---|---|---|---|
| 4,403,339 A | * | 9/1983 | Wevelsiep | G06K 7/10871 235/462.18 |
| 5,696,835 A | * | 12/1997 | Hennessey | H01L 21/681 348/86 |
| 5,745,600 A | * | 4/1998 | Chen | G06K 9/72 382/218 |
| 5,754,685 A | * | 5/1998 | Takahashi | G06K 9/00463 382/171 |
| 2003/0026482 A1 | * | 2/2003 | Dance | G06K 9/325 382/199 |
| 2014/0270526 A1 | * | 9/2014 | Wu | G06K 9/348 382/177 |
| 2017/0316567 A1 | * | 11/2017 | Kotoku | G06T 7/0016 |

OTHER PUBLICATIONS

Author Unknown, Extracting text OpenCV, Stack Overflow, Feb. 9 2016, https://web.archive.org/web/20160209222444/http://stackoverflow.com/questions/23506105/extracting-text-opencv.
Breuel et al., The OCRopus Open Source OCR System, Proc. SPIE 6815, Document Recognition and Retrieval XV 68150F, Jan. 28, 2008.
Chen et al., Extraction of text words in document images based on a statistical characterization, Journal of Electronic Imaging, 5(1), Jan. 25-36, 1996.
Nikolaou et al., Segmentation of historical machine-printed documents using Adaptive Run Length Smoothing and skeleton segmentation paths, Image and Vision Computing, 2010, 590-604, 28.

* cited by examiner

*Primary Examiner* — John Strege
(74) *Attorney, Agent, or Firm* — Van Pelt, Yi & James LLP (57) ABSTRACT

A system for determining bounding boxes includes the input interface and a processor. The input interface is configured to receive an image. The processor is configured to detect a line associated with connected components in the image; determine gap sizes within the line; determine a word structuring element size using the gap sizes; and determine bounding boxes for the line based at least in part on the word structuring element size.

19 Claims, 12 Drawing Sheets

300 — Department Store Receipt

Dept Store
2982-7
Cashier 301 Stacy
Fairview TX
75069-1640
972-549-4094

| Levi 514 Rigid | 520/4404/015312 |
| --- | --- |
| | UPC No. 039307996358 |
| | 58.00 |
| Sale Disc | -15.01 |
| Return Value | 42.99T1 |

302 —

| Subtotal | 42.99 |
| --- | --- |
| Sales Tax 8.2500% | 3.55 |

Total Items Sold: 1
Total Items Returned: 0

304 —

Total                                  46.54

Your Total Discount Today: 15.01

Department Store Receipt

Dept Store
2982-7
Cashier 301 Stacy
Fairview TX
75069-1640
972-549-4094

402 — Levi 514 Rigid    520/4404/015312
UPC No. 039307996358
58.00
Sale Disc    -15.01
Return Value    42.99T1

Subtotal    42.99
Sales Tax 8.2500%    3.55

Total Items Sold: 1
Total Items Returned: 0

Total    46.54

Your Total Discount Today: 15.01

FIG. 4

500 — Total Items Sold: 1

0.85 mm 0.9 mm

506 — Total Items Sold: 1

WORD BOUNDING BOX DETECTION

BACKGROUND OF THE INVENTION

Optical character recognition (OCR) is a powerful technique for transforming an image to text. OCR algorithms have been developed to be robust and accurate. However, OCR is most accurate when used on a page of regularly spaced, well-aligned text. An image including multiple typefaces, arbitrary text placement within the page, multiple text sizes, etc., is much more difficult for OCR algorithms to recognize accurately. These difficulties create large problems for successfully performing OCR algorithms on some text documents.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining bounding boxes comprises an input interface and a processor. The interface is configured to receive an image. The processor is configured to detect a line associated with connected components in the image, determine gap sizes (e.g., the whitespace region between characters after noise reduction) within the line, determine a word structuring element size using the gap sizes, determine bounding boxes for the line based at least in part on the word structuring element size, and provide the bounding boxes. In some embodiments, the system for determining bounding boxes additionally comprises a memory coupled to the processor and configured to provide the processor with instructions.

In some embodiments, a system for determining bounding boxes comprises a system for determining a box that bounds a region of an image, preferably containing a single word. OCR is used to determine characters of text that are contained within a bounding box. The bounding box typically surrounds a region of the image with relatively uniform background, similar font sizes, and does not usually include significant distortions so that OCR is efficient and accurate in recognizing the text. Bounding boxes around each word of the image are determined by locating connected components in the image, assembling the connected components into lines of text, and then splitting the lines of text into individual words. In some embodiments, locating each connected component in the image comprises drawing a component bounding box around each connected component. The baseline structuring element is used to assemble connected components into lines of text. A baseline structuring element comprises a rectangle describing the maximum distance between characters for them to be in the same line (e.g., if the baseline structuring element can overlap both characters at the same time, they are considered to be in the same line). A line comprises a horizontal line of connected components, so in some embodiments the vertical height of the baseline structuring element is the minimum possible (e.g., 1 pixel). The horizontal extent of the baseline structuring element is sufficiently wide to capture related text within a line (e.g., 25% of an image width). Any angle determined of the line (e.g., any non-horizontal line text orientation) is then corrected, and words within the line are split using a word structuring element. In some embodiments, the word structuring element is used in the same way as the baseline structuring element, however, its horizontal distance is chosen to be larger than spaces between characters of a word but shorter than spaces between words of a line. In some embodiments, a value of N pixels (e.g., 9 pixels) is chosen for the horizontal distance of the baseline structural element. All spaces in the line are measured. In some embodiments, the spaces form a bimodal distribution (e.g., spaces between characters of a word have similar small values and spaces between words of a line have similar larger values). An intermediate value is determined by computing the average size of all spaces in the line. This intermediate value creates a good classifier for distinguishing the spaces between characters of a word from the spaces between words of a line—for example, the intermediate value is very likely to be between the two portions of the bimodal distribution. Note this intermediate value is determined using local information of one line or a group of lines in the document allowing robustness against variations in text size, font type, or intercharacter spacing. This intermediate value can be determined with small numbers of spaces and locally so it can be used on small samples of text (e.g., text in a receipt). This is in contrast to methods needing large statistics from multiple documents or training/building of models using data from multiple documents to determine bounding boxes or separation distances in lines, between lines, or between words. The intermediate value is used as the horizontal distance of the word structuring element. In some embodiments, the word structuring element size is estimated using statistics of gap sizes from all or a group of detected lines in the document, such as the mean and standard deviation of the gaps over the group. Two connected components in the line are determined to be part of the same word in the event the word structuring element can overlap both characters at the same time. Bounding boxes are determined around each set of connected components to enclose an area that is determined to form a word. In some embodiments, the bounding boxes are then provided to an OCR system (e.g., to indicate isolated regions of the image to analyze) to determine text within the bounding box.

In some embodiments, a word structuring element size is determined and the text from bounding boxes is determined. It is determined whether a known word or set of words was identified within the bounding boxes (e.g., the word "tip" or one of the words "tip", "total", or "signature"). In the event that the word or set of words is not identified, an alternate word structuring element size is selected and the text from the bounding boxes determined using the newly selected word structuring element size is determined.

In some embodiments, a number of word structuring element sizes are used to determine bounding boxes and the subsequent sets of texts from them. The text that appears in a majority of the subsequent sets of texts determined or multiple subsequent sets of texts are determined (e.g., multiple but numbering more than a threshold) is chosen to be the corrected text.

Figure 1:
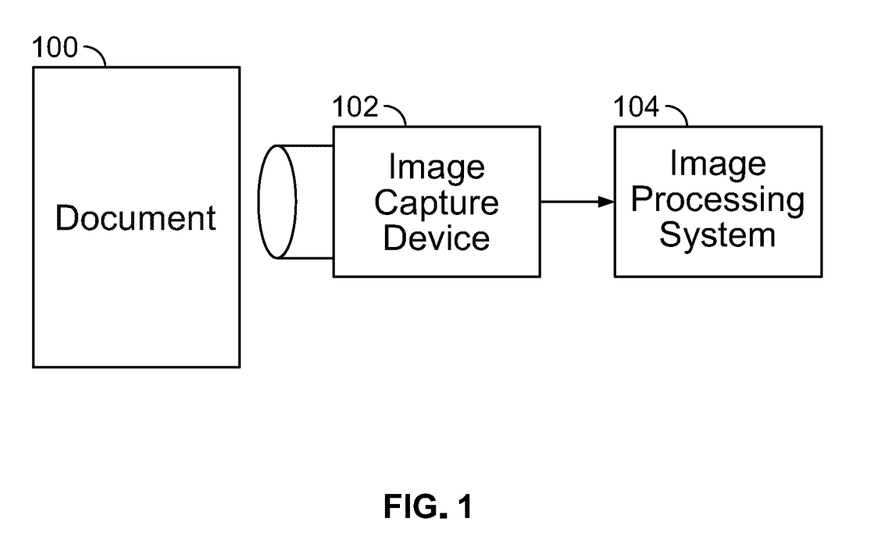
FIG. 1 is a block diagram illustrating an embodiment of a system for bounding box detection.

FIG. 1 is a block diagram illustrating an embodiment of a system for bounding box detection. In the example shown, document 100 comprises a document to be processed (e.g., a text document, a book page, a business card, a receipt, an invoice, etc.). An image of document 100 is captured by image capture device 102 and provided to image processing system 104. In some embodiments, when the image of document 100 is captured by image capture device 102, one or more imperfections are created in the image (e.g., an angle applied to the image, a non-uniform angle applied to the image, a document folding or crumpling, poor focus, etc.). In various embodiments, image capture device 102 comprises a digital camera, a scanner, a surface topography measurement device, or any other appropriate image capture device. In some embodiments, image capture device 102 comprises an image capture device integrated with a computer (e.g., a laptop computer, a desktop computer, a tablet computer, a smartphone, an Internet-of-things device, etc.). In some embodiments, image capture device 102 is integrated with image processing system 104. In some embodiments, image processing system 104 comprises a computer (e.g., a laptop computer, a desktop computer, a tablet computer, a smartphone, an Internet-of-things device, etc.). Image processing system 104 processes the image to determine a set of bounding boxes, each bounding box bounding a word of document 100. After image processing system 104 determines a set of bounding boxes, image processing system 104 performs optical character recognition on each portion of document 100 indicated by the set of bounding boxes. In some embodiments, the set of bounding boxes and the associated image is provided to a separate system for optical character recognition.

Figure 2:
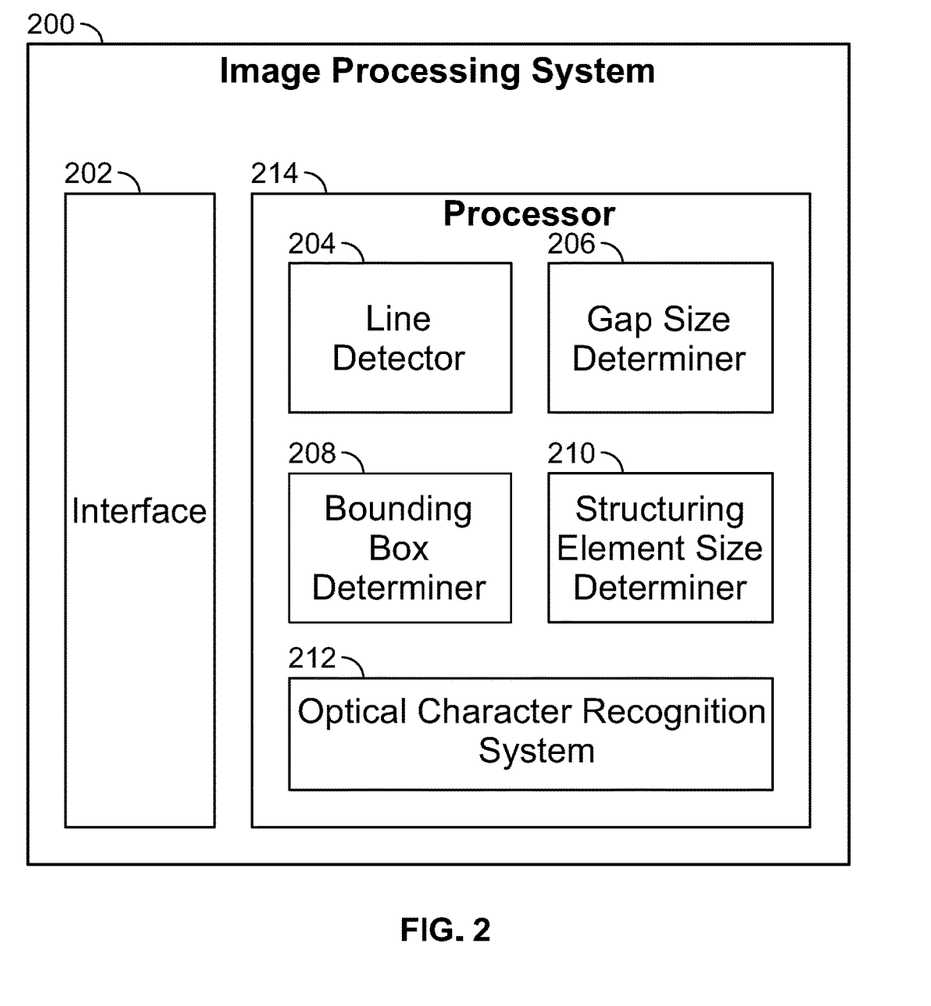
FIG. 2 is a block diagram illustrating an embodiment of an image processing system.

FIG. 2 is a block diagram illustrating an embodiment of an image processing system. In some embodiments, image processing system 200 comprises image processing system 104 of FIG. 1. In the example shown, image processing system comprises interface 202 and processor 214. Interface 202 is for receiving data (e.g., images for processing, control data, etc.) and providing data (e.g., text data, processed image data, bounding box data, etc.). Processor 214 has functional modules (e.g., runs code to perform the functions of) that include line detector 204, gap size determiner 206, structuring element size determiner 210, and bounding box determiner 208. Line detector 204, gap size determiner 206, structuring element size determiner 210, and bounding box determiner 208 comprise data processing elements for determining a set of bounding boxes from image data. Line detector 204 is for determining a line from an image—for example, a line associated with one or more characters. Gap size determiner 206 is for determining gap sizes from a line—for example, gaps between characters associated with the line. Structuring element size determiner 210 is for determining a structuring element size from the gap sizes—for example, determining a size that thresholds the spacing between words and the spacing between characters of a word. Bounding box determiner 208 is for determining one or more bounding boxes from an image based at least in part on the structuring element size—for example, separating groups of characters and their surrounding space to define a bounding box whose contents can be analyzed using optical character recognition. Optical character recognition system 212 is for performing optical character recognition on image data (e.g., image data received by interface 202) within a bounding box. Optical character recognition system 212 receives bounding box data from bounding box determiner 208 and performs optical character recognition on regions of image data indicated to be words by the bounding box data.

Figure 3A:
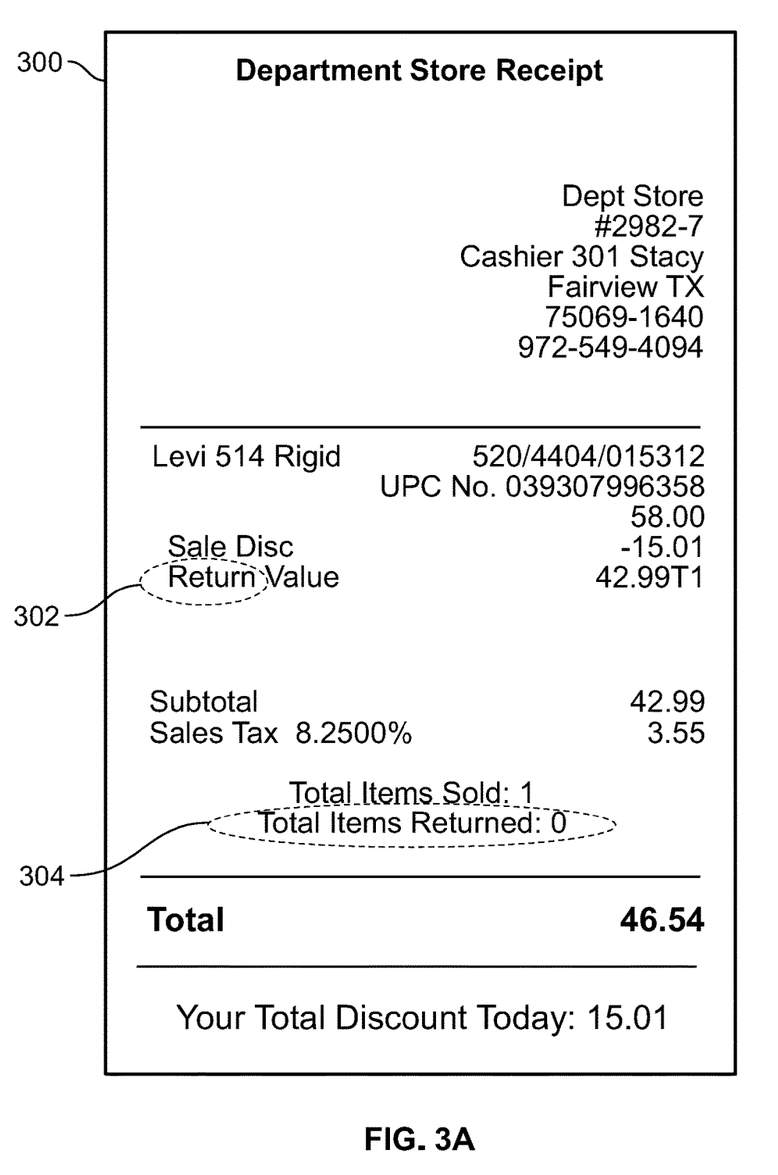
FIG. 3A is a diagram illustrating an embodiment of a receipt.

FIG. 3A is a diagram illustrating an embodiment of a receipt. In some embodiments, receipt 300 comprises a document for processing (e.g., document 100 of FIG. 1). In the example shown, receipt 300 comprises a plurality of characters arranged into words (e.g., word 302, "Return") and lines (e.g., line 304, "Total Items Returned: 0"). A word comprises a set of one or more characters arranged in a horizontal row with a space placed between the characters. A line comprises a set of one or more words arranged in a horizontal row with a space placed between the words. The space between words of a line is typically larger than the space between characters of a word. The characters of FIG. 3 are typeset in a plurality of different ways (e.g., right-justified text, left-justified text, center justified text, small sized text, large sized text, etc.). In some embodiments, the plurality of typesetting options makes optical character recognition on receipt 300 as a whole challenging. In some embodiments, efficiency is improved by identifying individual words of FIG. 3 and then performing optical character recognition on the individual words. In some embodiments, the image of FIG. 3 includes one or more imperfections.

Figure 3B:
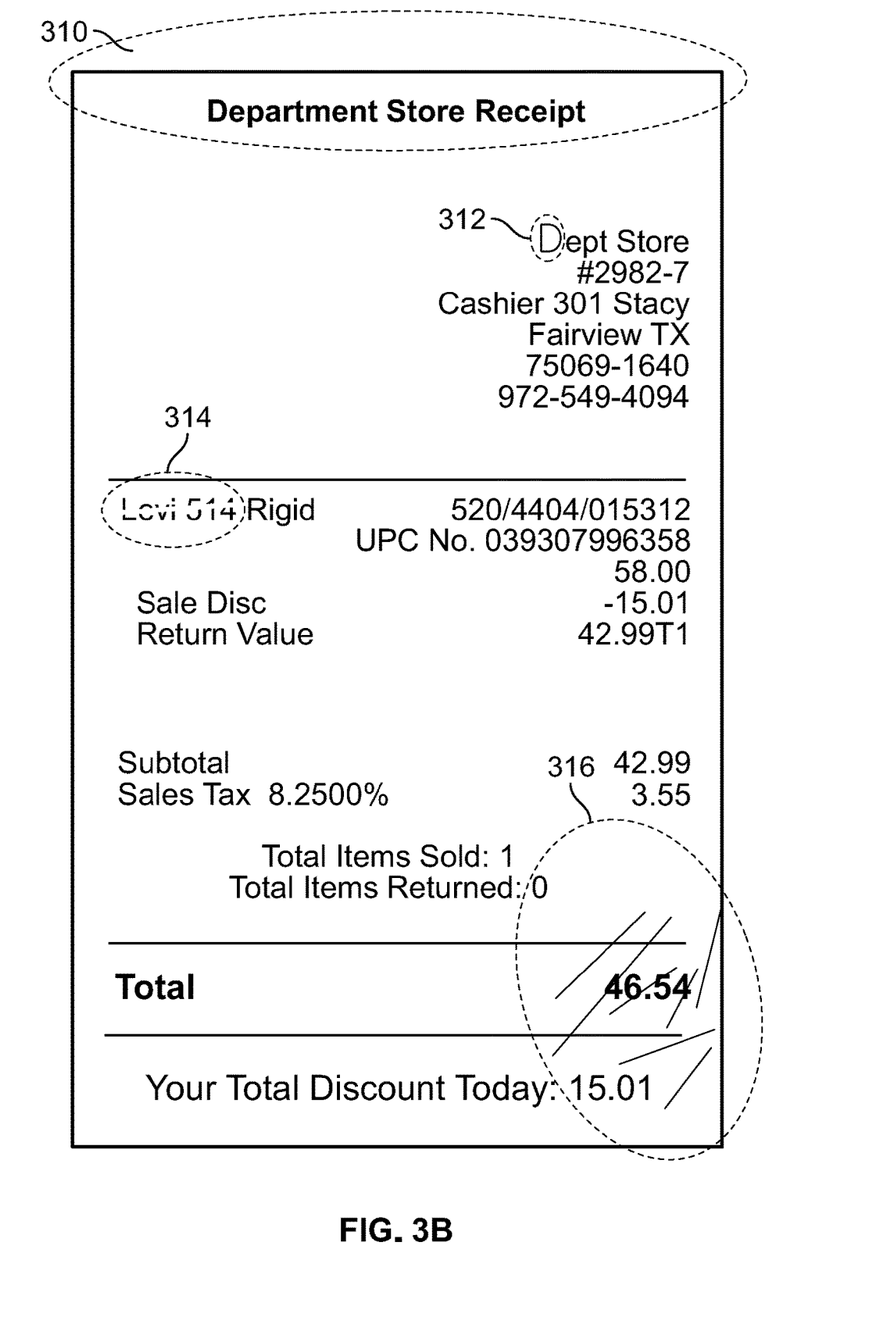
FIG. 3B is a diagram illustrating an embodiment of a receipt with imperfections.

FIG. 3B is a diagram illustrating an embodiment of a receipt with imperfections. In some embodiments receipt of FIG. 3B comprises a document for processing (e.g., document 100 of FIG. 1). In the example shown, receipt includes section 310 at an angle. The system corrects angled lettering by performing a correction to reorient the characters in a line to be horizontal. Letter 312 that is at lower contrast and deformed. Glitched section 314 with letters that have incomplete inked parts. Crumpled section 316 with lines in image due to folds of crumples on the paper of the receipt. The imperfections of letter 312 and crumpled section 316 do not interfere with the bounding box detection described herein, and no specific correction mechanisms are needed. In some embodiments, glitched section 314 is addressed by an increase in the height of word structuring element (e.g., 2 to 5 px instead of 1 px).

Figure 4:
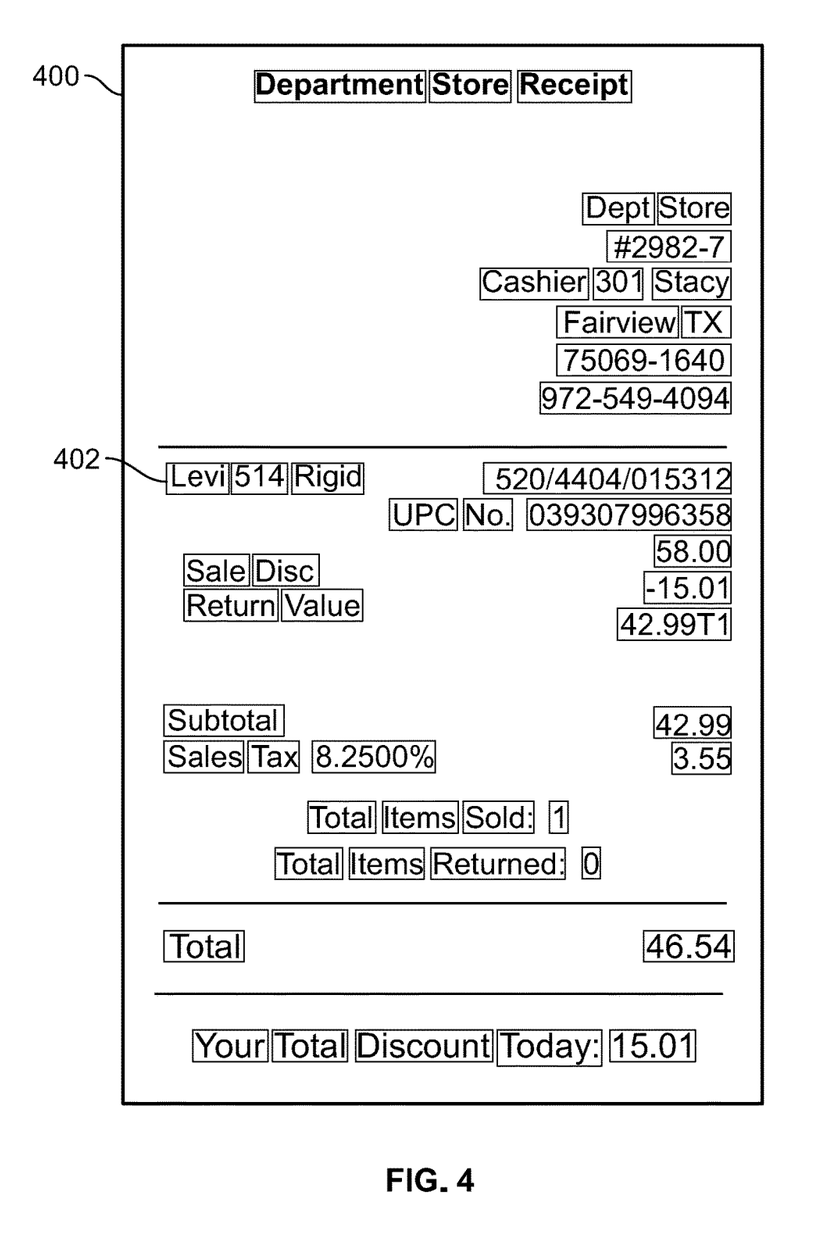
FIG. 4 is a diagram illustrating an embodiment of a receipt including bounding boxes.

FIG. 4 is a diagram illustrating an embodiment of a receipt including bounding boxes. In some embodiments, the bounding boxes of FIG. 4 comprise bounding boxes determined by image processing system 104 of FIG. 1. In the example shown, the bounding boxes of FIG. 4 (e.g., bounding box 402) indicate locations of individual words within an image of receipt 400.

Figure 5A:
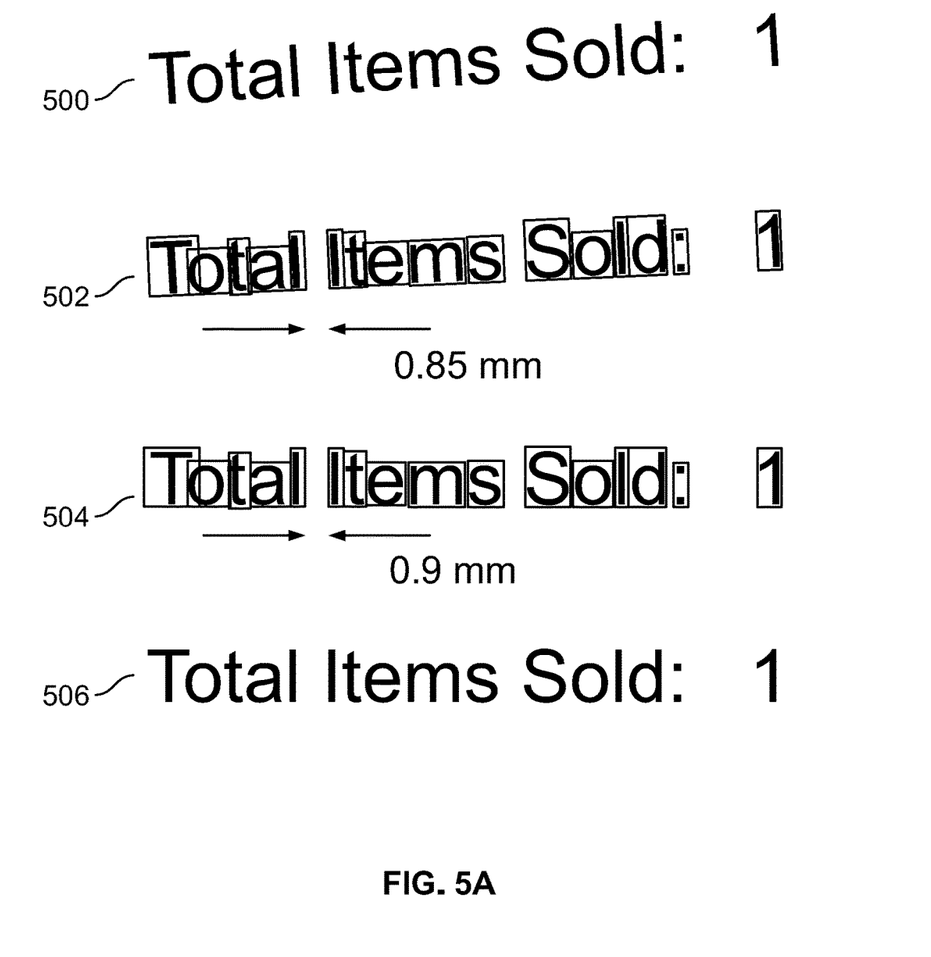
FIG. 5A is a diagram illustrating an embodiment of steps for correcting a line angle.

FIG. 5A is a diagram illustrating an embodiment of steps for correcting a line angle. In some embodiments, a line angle is determined by a gap size determiner (e.g., gap size determiner 206 of FIG. 2) in a line detected by a line detector. In the example shown, line 500 comprises a line detected by a line detector. Line 500 is at an angle to the horizontal. As a first step to determining the line angle, a character bounding box is drawn around each character. Line 502 shows line 500 comprising character bounding boxes drawn around each character. Horizontal spaces between character bounding boxes of line 502 are determined. In some embodiments, some horizontal spaces between character bounding boxes of line 502 are zero or less than zero (e.g., the character bounding boxes overlap) and are not measured. In the example shown, only the space between the word "Total" and the word "Items" is measured. In various embodiments, all spaces are measured, all positive valued spaces are measured, the largest space is measured, the second largest space is measured, the three largest spaces are measured, or any other appropriate spaces are measured. The space between the word "Total" and the word "Items" in line 502 is measured to be 0.85 mm. The line angle is determined by rotating the line image to different angles and repeating the process of drawing character bounding boxes and measuring the horizontal space of a gap. In various embodiments, the different angles are determined by rotating the line image to a predetermined set of angles, rotating the line in different directions until space size minima and maxima are found, using a nonlinear zero-finding algorithm such as Newton's Method, or are determined in any other appropriate way. When the gap size is maximized, the line has been rotated to the horizontal position. Line 504 comprises line 500, rotated to the horizontal, with character bounding boxes drawn. The space between the word "Total" and the word "Items" in line 504 is measured to be 0.9 mm. Line 506 comprises line 500, rotated to the horizontal.

Figure 5B:
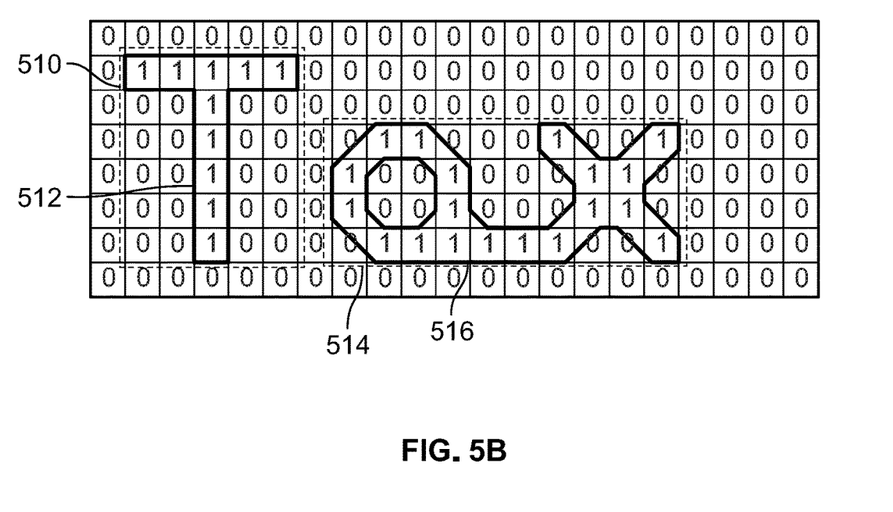
FIG. 5B is a diagram illustrating an embodiment of a binarized image used during determining bounding boxes.

FIG. 5B is a diagram illustrating an embodiment of a binarized image used during determining bounding boxes. In some embodiments, a character box of FIG. 5A is determined using the binarized image of FIG. 5B. In the example shown, the character bounding boxes are determined by first denoising the image (e.g., using a median filter to remove salt and pepper noise) and then next determining connected components. To determine connected components, the image is binarized by setting pixels with intensity above a threshold (global or local threshold) value to 1s and setting the remaining pixels to 0s, the adjacent pixels with value 1 are then merged into "islands" and returned as the connected components. For example, connected component 512 and connected component 516 are designated and returned. To determine component bounding boxes, for each connected component the minimum enclosing rectangle is computed (e.g., component bounding box 510 and component bounding box 514): First, the x and y coordinates of all pixels with value 1 within a given connected component are grouped into two sets: X and Y. Then, the top-left xy-coordinate of the bounding rectangle is given by (minimum(X), minimum(Y)). Finally, the width and height of the rectangle is calculated as Width=maximum(X)−minimum(X), and Height=maximum(Y)−minimum(Y). This process is repeated for each connected component. Each box is very likely to be a single character, but each box is sometimes more than one character for handwriting or because characters are attached due to imperfection of printing.

Figure 6:
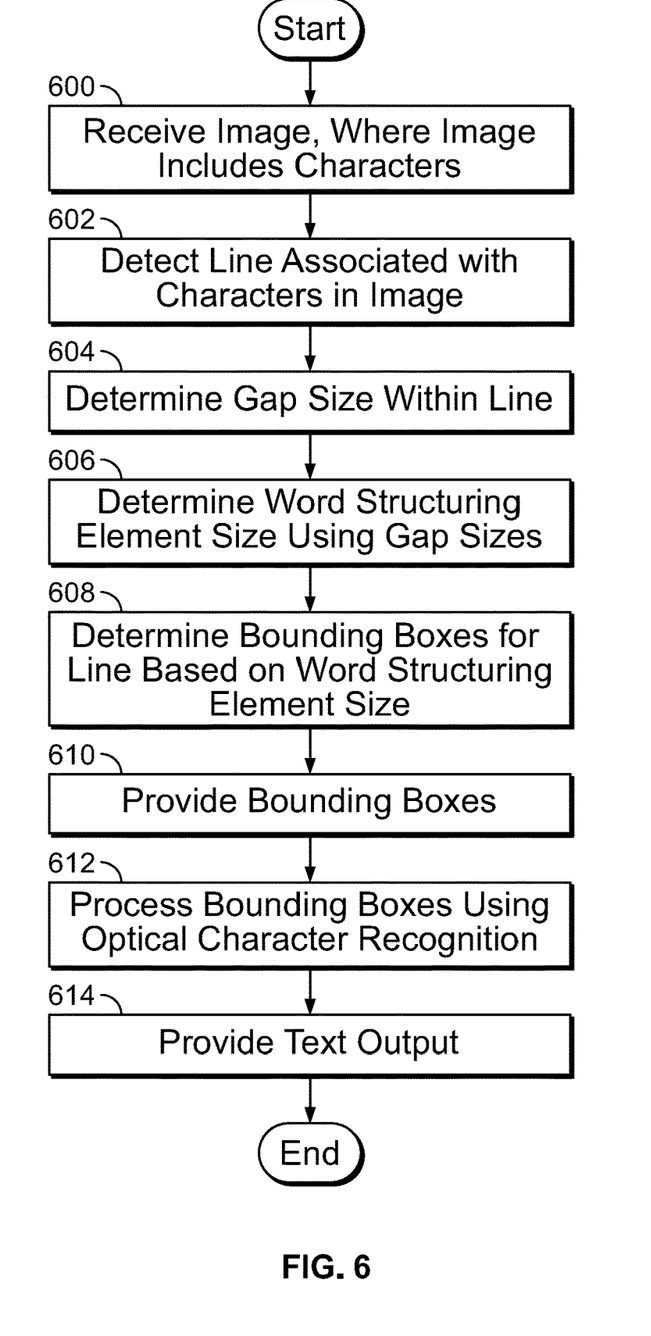
FIG. 6 is a flow diagram illustrating an embodiment of a process for detecting word bounding boxes.

FIG. 6 is a flow diagram illustrating an embodiment of a process for detecting word bounding boxes. In some embodiments, the process of FIG. 6 is executed by image processing system 104 of FIG. 1. In the example shown, in 600, an image is received, where the image includes characters. In some embodiments, the characters comprise alphanumeric characters. In various embodiments, the characters comprise symbols, punctuation, emoji, foreign language characters, or any other appropriate characters. In 602, a line associated with characters is detected in the image. In some embodiments, the line comprises a line of a plurality of lines. In some embodiments, a line comprises a set of characters arranged approximately horizontally. In 604, gap size is determined within the line. For example, one or more gaps between characters is determined in a line. In some embodiments, determining gap sizes within the line comprises determining the line angle. In 606, a word structuring element size is determined using the gap sizes. In some embodiments, a word structuring element size comprises a gap size larger than a typical gap size between characters of a word. In some embodiments, a word structuring element size comprises a gap size smaller than a typical gap size between words of a line. In 608, bounding boxes for the line are determined based at least in part on the structuring element size. In 610, the bounding boxes are provided. In 612, bounding boxes are processed using optical character recognition. For example, text is generated using optical character recognition of images within bounding boxes. In 614, text output is provided. For example, text output is provided for further analysis.

In some embodiments, a word structuring element size is determined and the text from bounding boxes is determined. It is determined whether a known word or set of words was identified within the bounding boxes (e.g., the word "tip" or one of the words "tip", "total", or "signature"). In the event that the word or set of words is not identified, an alternate word structuring element size is selected and the text from the bounding boxes determined using the newly selected word structuring element size.

In some embodiments, a number of word structuring element sizes are used to determine bounding boxes and the subsequent sets of texts from them. The text that appears in a majority of the subsequent sets of texts determined or multiple subsequent sets of texts are determined (e.g., multiple but numbering more than a threshold) is chosen to be the corrected text.

Figure 7:
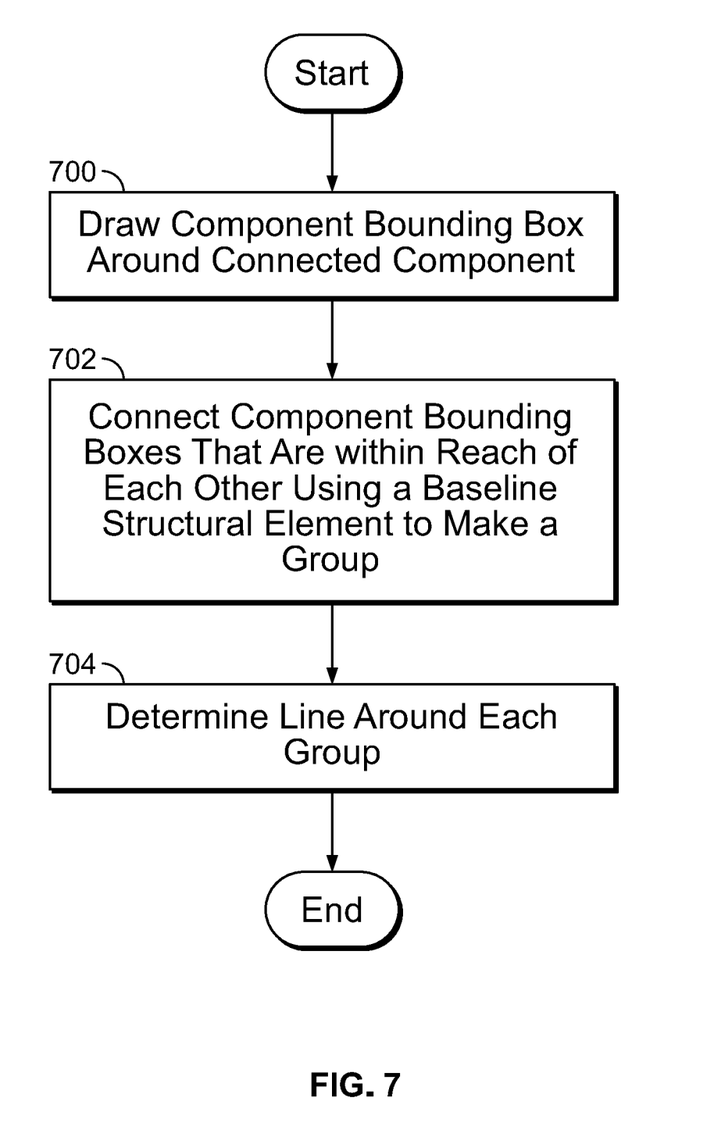
FIG. 7 is a flow diagram illustrating an embodiment of a process for detecting a line of characters in an image.

FIG. 7 is a flow diagram illustrating an embodiment of a process for detecting a line of characters in an image. In some embodiments, the process of FIG. 7 implements 602 of FIG. 6. In the example shown, in 700, a component bounding box is drawn around a connected component. In 702, connected bounding boxes that are within reach of each other using a baseline structural element are connected to make a group. A baseline structural element comprises a region representing the horizontal and vertical distance between characters that should be included in the same line. A line comprises one row of characters, thus the baseline structural element should have the smallest possible vertical height (e.g., one pixel). The baseline structural element should be wide enough to cross spaces between words or sentences but no wider than necessary. In some embodiments, the baseline structural element is 5 pixels (px) wide, 9 px wide, 14 px wide, 0.3% of image width, 0.6% of image width, 1.0% of image width, or any other appropriate number of pixels wide. In some embodiments, the baseline structural element is expressed as a percentage of image width. In some embodiments, the image is resized to a standard width (e.g., 1400 px). In some embodiments, in the event that lines are horizontal (or near-horizontal), the structuring element width is set to 25% the image width (e.g., 350 px) for connecting all characters belonging to the same line. In 704, a line is drawn around each group. For example, the coordinates of the minimum horizontal bounding rectangle are computed for each connected component. The horizontal bounding rectangle is used to extract a given line (e.g., if cropped from the image, each rectangle is most likely a text line). In some embodiments, each connected component is an individual line given that the image was pre-processed with a "wide" line structuring element. In some embodiments, morphological closing is used to connect the characters of each line based on a line structuring element (e.g., a wide line structuring element that is 25% of the image width—for example, 350 px for a 1400 px width image) to connect the pixels.

Figure 8:
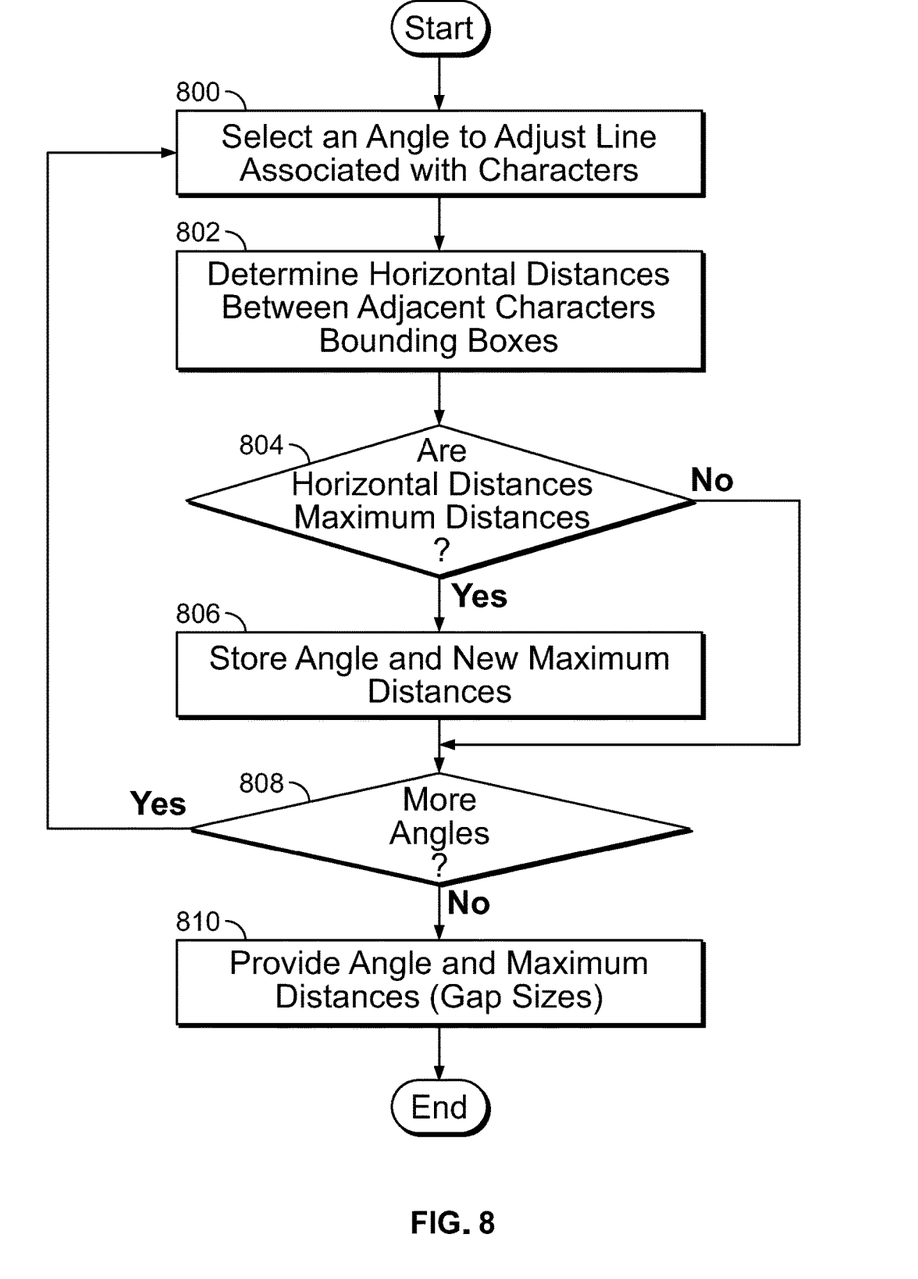
FIG. 8 is a flow diagram illustrating an embodiment of a process for determining gap sizes within a line.

FIG. 8 is a flow diagram illustrating an embodiment of a process for determining gap sizes within a line. In some embodiments, the process of FIG. 8 implements 604 of FIG. 6. In the example shown, in 800, an angle is selected to adjust the line associated with characters. For example, the characters of a line and their associated bounding boxes are adjusted so that the line is at a new selected angle with respect to the horizontal. In 802, horizontal distances between adjacent characters bounding boxes are determined. For example, the horizontal distance between each bounding box of a line of bounding boxes is determined and stored as a set of distances associated with the line and the angle. In some embodiments, horizontal distances between a subset of adjacent bounding boxes are determined. In some embodiments, horizontal distances between all adjacent bounding boxes are determined. In some embodiments, an average of horizontal distances between adjacent bounding boxes is determined. In 804, it is determined whether the horizontal distances are maximum distances. For example, the set of distances determined are compared to other stored set of distances associated with other angles to see whether the set is greater than the other stored sets. In the event that the horizontal distances are not maximum distances, control passes to 808. In the event that the horizontal distances are maximum distances, in 806 the angle and the new maximum distances are stored. In 808, it is determined whether there are more angles. In some embodiments, in the event a horizontal distance maximum is passed (e.g., the horizontal distances were increasing and then begin to decrease), it is not necessary to test more line angles. In some embodiments, a predetermined set of line angles is tested. In the event there are more angles, control passes to 800. In the event that there are not more angles, in 810 angle and maximum distances (e.g., gap sizes) are provided. For example, the set of gap sizes (e.g., the whitespace region between characters) and angle associated with the line of characters are provided.

Figure 9:
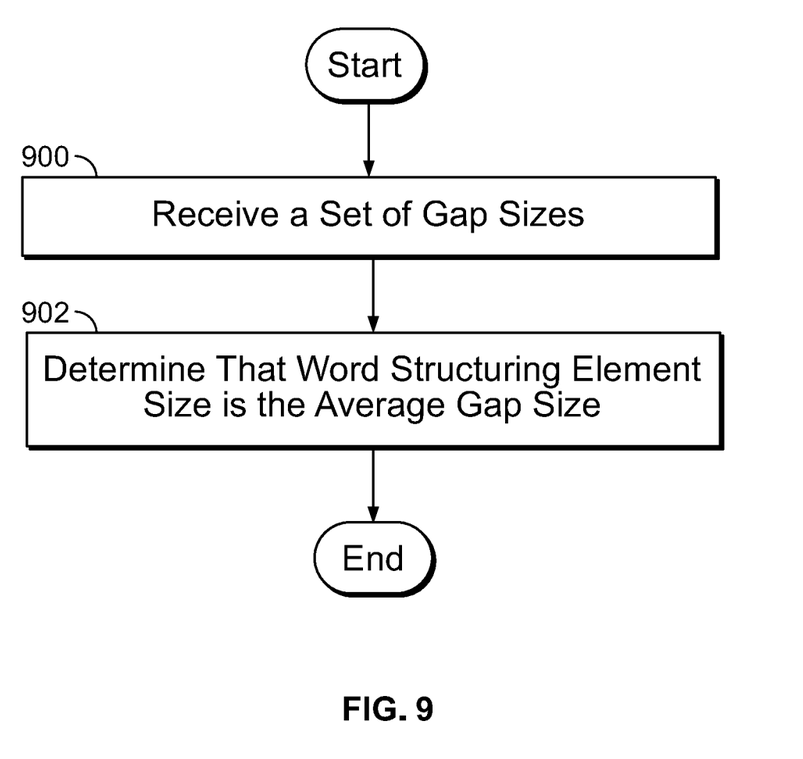
FIG. 9 is a flow diagram illustrating an embodiment of a process for determining a structuring element size using gap sizes.

FIG. 9 is a flow diagram illustrating an embodiment of a process for determining a structuring element size using gap sizes. In some embodiments, the process of FIG. 9 implements 606 of FIG. 6. In the example shown, in 900, a set of gap sizes is received. The gap sizes comprise a set of gap sizes of a line (e.g., comprises gap sizes of gaps between characters of a word and gap sizes of gaps between words of a line). In 902 it is determined that the word structuring element size is the average gap size. For example, the word structuring element size is used to determine whether character separation is small enough to combine characters into a word or large enough to separate characters/groups of characters into words. In various embodiments, determining the structuring element size comprises determining the average gap size, determining the median gap size, determining the standard deviation of the gap size, or determining any other appropriate gap size statistic. In various embodiments, the word structuring element size comprises the mean of all gap sizes, the mean of all gap sizes plus a standard deviation of the gap sizes, the mean of all gap sizes plus two standard deviations of all gap sizes, or any other appropriate size. In some embodiments, the word structuring element comprises a rectangle of the determined width and one pixel height.

$$\text{Structuring element width} = \frac{1}{n}\sum_{i=1}^{n} \text{Gap}_i \text{ s.t.} \begin{cases} \text{Gap}_i \in Y = \{\text{Gap}_j, j = 1 \ldots n \mid \text{Gap}_j > \theta\} \\ \text{and} \\ \theta = f(L, C) \end{cases}$$

Where, $\theta$ is a threshold, and $f$ is a function, of L and C, where L is the line height and C the character width. $f$ can be of the following form.

$$f(L,C) = \max(\alpha L^\beta, C)$$

Where, $\alpha$ and $\beta$ are parameters set by observing few examples (trial and error). Typical values that were found to work well for receipts are $\alpha=200$ and $\beta=2$.

Figure 10:
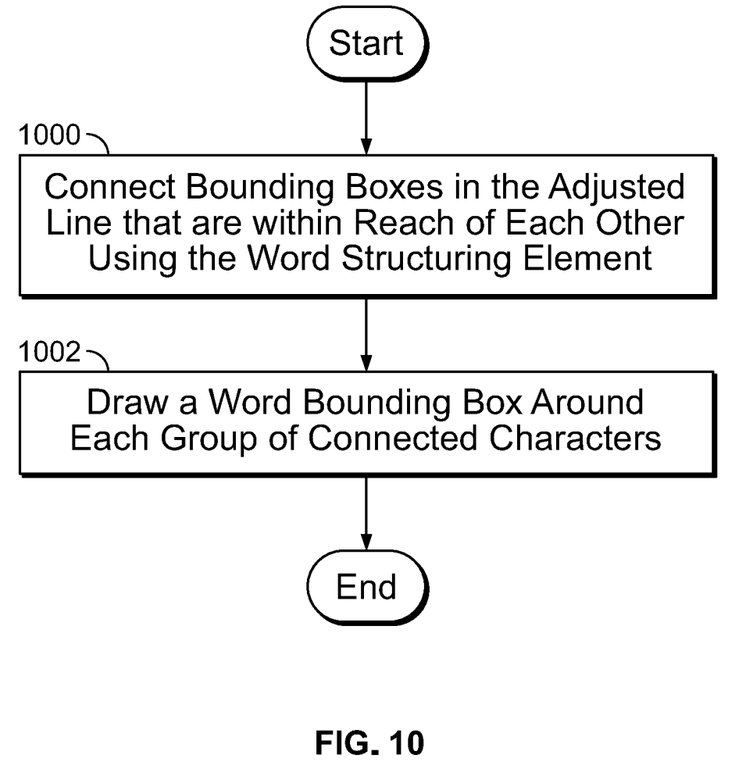
FIG. 10 is a flow diagram illustrating an embodiment of a process for determining bounding boxes for a line based at least in part on a structuring element size.

FIG. 10 is a flow diagram illustrating an embodiment of a process for determining bounding boxes for a line based at least in part on a structuring element size. In some embodiments, the process of FIG. 10 implements 608 of FIG. 6. In 1000, bounding boxes in the adjusted line within reach of each other using the word structuring element are connected. To connect connected components within reach of each other the image is processed using a morphological closing operator with a rectangular structuring element of size equal to the computed size from the previous step (e.g., 902 of FIG. 9). In some embodiments, the word structuring element size is determined such that characters of the same word are connected but words in the same line are not connected. In 1002, a word bounding box is drawn around each group of connected characters.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining bounding boxes, comprising:
an input interface configured to receive an image; and
a processor configured to:
detect a line associated with connected components in the image;
determine gap sizes within the line, wherein determining the gap sizes within the line comprises determining a line angle;
determine a word structuring element size using the gap sizes; and
determine bounding boxes for the line based at least in part on the word structuring element size.

2. The system of claim 1, wherein the line comprises one of a plurality of lines.

3. The system of claim 1, wherein the line comprises a set of characters arranged approximately horizontally.

4. The system of claim 1, wherein determining the gap sizes within the line comprises adjusting the line and the characters to set the line angle to horizontal.

5. The system of claim 1, wherein a gap size of the gap sizes comprises a size of a whitespace region between the characters.

6. The system of claim 1, wherein determining the gap sizes comprises determining a set of all gap sizes within the line.

7. The system of claim 1, wherein the structuring element size comprises a gap larger than a typical gap between letters of a word.

8. The system of claim 1, wherein the structuring element size comprises a gap smaller than a typical gap between words in the line.

9. The system of claim 1, wherein determining the structuring element size comprises determining a mean of the gap sizes or a mean of the gap sizes plus a standard deviation of the gap sizes.

10. The system of claim 1, wherein determining the structuring element size comprises determining a standard deviation of the gap sizes.

11. The system of claim 1, wherein the processor is further configured to perform optical character recognition on a portion of the image indicated by a bounding box of the bounding boxes.

12. The system of claim 1, wherein a bounding box of the bounding boxes comprises a box around a word of the line.

13. The system of claim 1, wherein determining bounding boxes comprises determining that two or more connected components are in a same bounding box in the event that the gap between them is smaller than the structuring element size.

14. The system of claim 13, wherein determining bounding boxes comprises drawing a box around each set of connected components determined to be in the same bounding box.

15. The system of claim 1, wherein determining bounding boxes comprises determining that two or more connected components are in different bounding boxes in the event that the gap between them is larger than the structuring element size.

16. The system of claim 1, wherein the connected components comprise binarized pixels associated with alphanumeric characters.

17. The system of claim 1, wherein the processor is further configured to provide the bounding boxes.

18. A method for determining bounding boxes, comprising:
receiving an image;
detecting, using a processor, a line associated with connected components in the image;
determining gap sizes within the line, wherein determining the gap sizes within the line comprises determining a line angle;
determining a word structuring element size using the gap sizes; and
determining bounding boxes for the line based at least in part on the word structuring element size.

19. A computer program product for determining bounding boxes, the computer program product being embodied in a non-transitory computer readable storage medium and comprising computer instructions for:
receiving an image;
detecting a line associated with connected components in the image;
determining gap sizes within the line, wherein determining the gap sizes within the line comprises determining a line angle;
determining a word structuring element size using the gap sizes; and
determining bounding boxes for the line based at least in part on the word structuring element size.

* * * * *